(12) United States Patent
In et al.

(10) Patent No.: US 11,828,410 B2
(45) Date of Patent: Nov. 28, 2023

(54) ACTUATOR AND TRIPOD STRUCTURE EQUIPPED THEREWITH

(71) Applicant: Saginomiya Seisakusho, Inc., Tokyo (JP)

(72) Inventors: Eisei In, Sayama (JP); Tomonori Uchida, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 0 days.

(21) Appl. No.: 17/625,927

(22) PCT Filed: Jun. 22, 2020

(86) PCT No.: PCT/JP2020/024420
§ 371 (c)(1),
(2) Date: Jan. 10, 2022

(87) PCT Pub. No.: WO2021/039058
PCT Pub. Date: Mar. 4, 2021

(65) Prior Publication Data
US 2022/0252210 A1    Aug. 11, 2022

(30) Foreign Application Priority Data
Aug. 23, 2019    (JP) ................................. 2019-152948

(51) Int. Cl.
*F16H 25/24*    (2006.01)
*F16M 11/20*    (2006.01)
(Continued)

(52) U.S. Cl.
CPC ......... *F16M 11/2092* (2013.01); *F16C 29/04* (2013.01); *F16H 25/24* (2013.01); *B25J 17/0216* (2013.01); *F16H 2025/204* (2013.01)

(58) Field of Classification Search
CPC ............... F16H 2025/204; F16H 25/24; F16H 25/2003; F16H 25/2009; F16H 2025/2031; B25J 17/0216; F16M 11/2085
See application file for complete search history.

(56) References Cited

U.S. PATENT DOCUMENTS 2,368,345 A * 1/1945 Clark ....................... G01N 3/42
                                                            74/89.41
6,145,395 A    11/2000 Swanson et al.
(Continued)

FOREIGN PATENT DOCUMENTS

JP    S41-009248 Y1    5/1941
JP    2001-124175 A    5/2001
(Continued)

OTHER PUBLICATIONS

International Preliminary Report on Patentability dated Feb. 17, 2022, issued in PCT Application No. PCT/JP2020/024420, filed Jun. 22, 2020.
(Continued)

*Primary Examiner* — Gregory Robert Weber
(74) *Attorney, Agent, or Firm* — Workman Nydegger (57) ABSTRACT

An object of the present invention is to provide an actuator capable of reducing a shock in acceleration at the time of a turn caused by a load in a lateral direction orthogonal to an axis of the actuator even when the load is excessive while reducing manufacturing cost and manufacturing man-hours, and a tripod structure including the actuator. An actuator according to the present invention includes: a pipe; a ball screw used as a feed screw; a conversion nut used as a feed nut and screwed with the ball screw; a piston fixed integrally to the conversion nut and driven to expand and contract from a free end which is one end of the pipe; and a rolling bearing unit being provided on a tip of the free end of the pipe and (Continued)

including a plurality of roller followers holding the piston movably.

5 Claims, 7 Drawing Sheets

(51) Int. Cl.
*F16C 29/04* (2006.01)
*F16H 25/20* (2006.01)
*B25J 17/02* (2006.01)

(56) References Cited

U.S. PATENT DOCUMENTS

| | | | | |
|---|---|---|---|---|
| 6,558,038 | B2* | 5/2003 | Teramach | H02K 41/033 |
| | | | | 384/45 |
| 7,261,031 | B2* | 8/2007 | Hama | F16C 29/001 |
| | | | | 384/57 |
| 7,628,087 | B2* | 12/2009 | Gerbier | F16H 25/20 |
| | | | | 74/89.23 |
| 8,042,416 | B2* | 10/2011 | Pfister | B23Q 5/40 |
| | | | | 74/89.33 |
| 9,151,372 | B2* | 10/2015 | Keller | F16H 25/20 |
| 10,186,165 | B2* | 1/2019 | Hosaka | G09B 9/14 |
| 10,294,990 | B2* | 5/2019 | Owada | F16C 29/08 |
| 10,413,071 | B2* | 9/2019 | Lu | A47C 7/38 |
| 2005/0132830 | A1 | 6/2005 | Gerbier et al. | |
| 2005/0252371 | A1 | 11/2005 | Hama | |
| 2009/0049938 | A1* | 2/2009 | Teramachi | F16H 25/2204 |
| | | | | 74/22 A |
| 2016/0293039 | A1 | 10/2016 | Hosaka | |
| 2019/0145504 | A1* | 5/2019 | Lan | F16H 25/2015 |
| | | | | 74/89.23 |

FOREIGN PATENT DOCUMENTS

| | | | |
|---|---|---|---|
| JP | 2003-065332 A | | 3/2003 |
| JP | 2003065332 A | * | 3/2003 |
| JP | 2004-270746 A | | 9/2004 |
| JP | 2005-325943 A | | 11/2005 |
| JP | 2015-040614 A | | 3/2015 |
| JP | 58-13706 B2 | | 10/2015 |
| WO | 2006/106817 A1 | | 10/2006 |
| WO | 2015/019535 A1 | | 2/2015 |

OTHER PUBLICATIONS

European Extended Search Report, dated May 24, 2023, from European application No. 20855991.4.
1 European Examination Report, dated Sep. 28, 2023, from European App. No. 20855991.4, 6 pages.

* cited by examiner

ACCELERATION PROPERTY OF CONVENTIONAL ACTUATOR
(a)

ACCELERATION PROPERTY OF ACTUATOR ACCORDING TO PRESENT INVENTION
(b)

FIG.7

ACTUATOR AND TRIPOD STRUCTURE EQUIPPED THEREWITH

TECHNICAL FIELD

The present invention relates to an actuator and a tripod structure equipped therewith.

BACKGROUND ART

Figure 1:
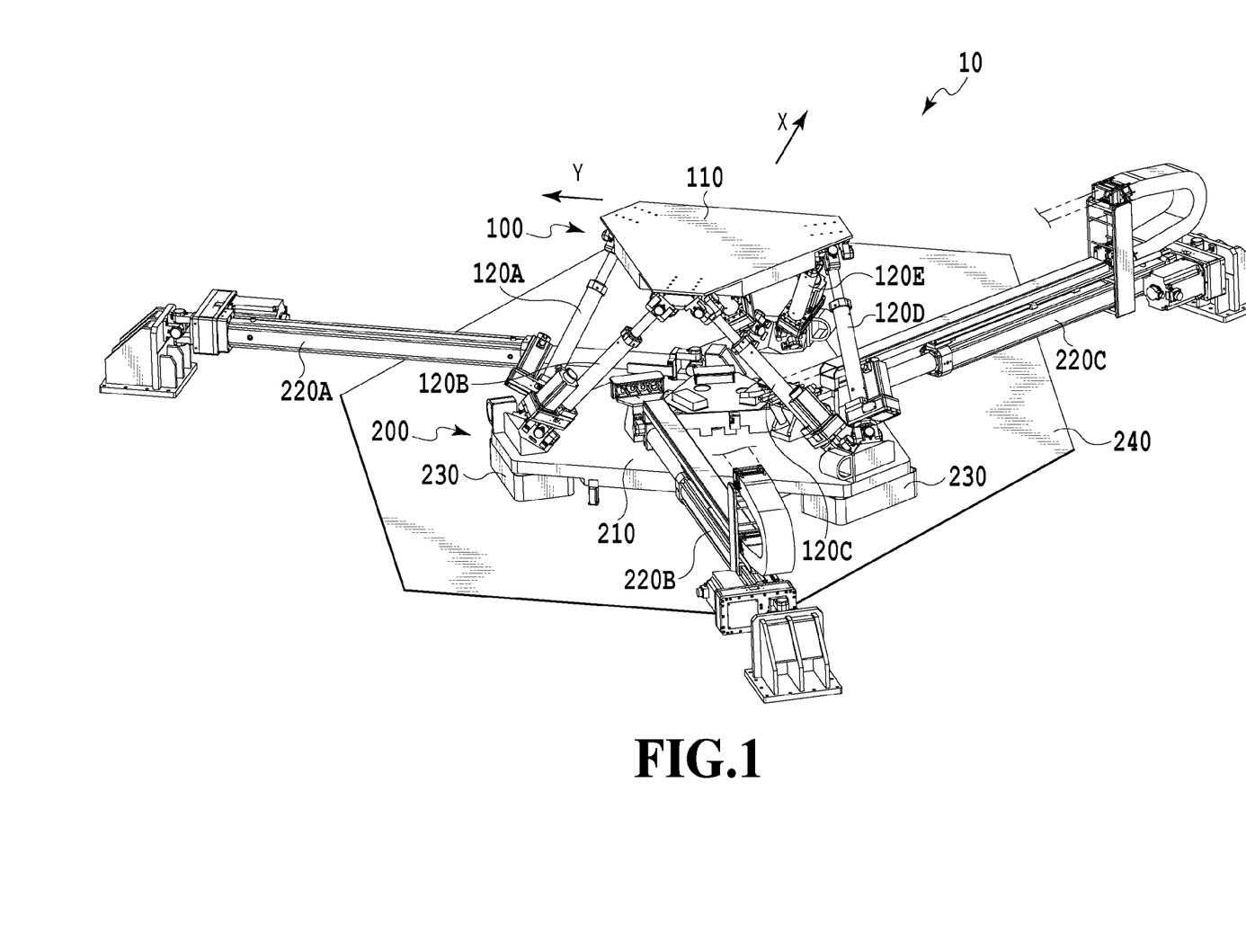
FIG. 1 is a diagram showing an example of a vibration system for a driving simulator.

A driving simulator disclosed in Patent Literature 1 conventionally has been known. As shown in FIG. 1 described later, a vibration system in such a driving simulator mainly includes a hexapod (Hexapod: 6 axes) structure and a tripod (Tripod: 3 axes) structure.

The hexapod structure, also called a Stewart platform, is configured to support a top plate whose top is provided with a cockpit using six actuators. Such a hexapod structure is configured to reproduce, not only translational motions in three directions of X, Y, and Z axes consisting of the X and Y axes set on a sliding floor plane and the Z axis perpendicular to the plane, but also rotary motions around each axis, that is, tilt motions with 6 degrees of freedom consisting of motions in a forward-backward direction, a left-right direction, and an up-down direction, a roll motion, a pitch motion, and a yaw motion, so that a driving state can be simulated based on a driving operation by an operator.

In the tripod structure, three actuators are connected to a moving base on which the hexapod structure described above is mounted so as to be separated from each other at a central angle of 120° in an initial state as viewed from above, and the moving base can move in an X-Y direction on the sliding floor and can rotate around the Z axis (yaw motion). A small-amplitude motion at a relatively high frequency is reproduced by the hexapod structure, and a large-amplitude motion at a relatively low frequency is reproduced by the tripod structure.

Figure 2:
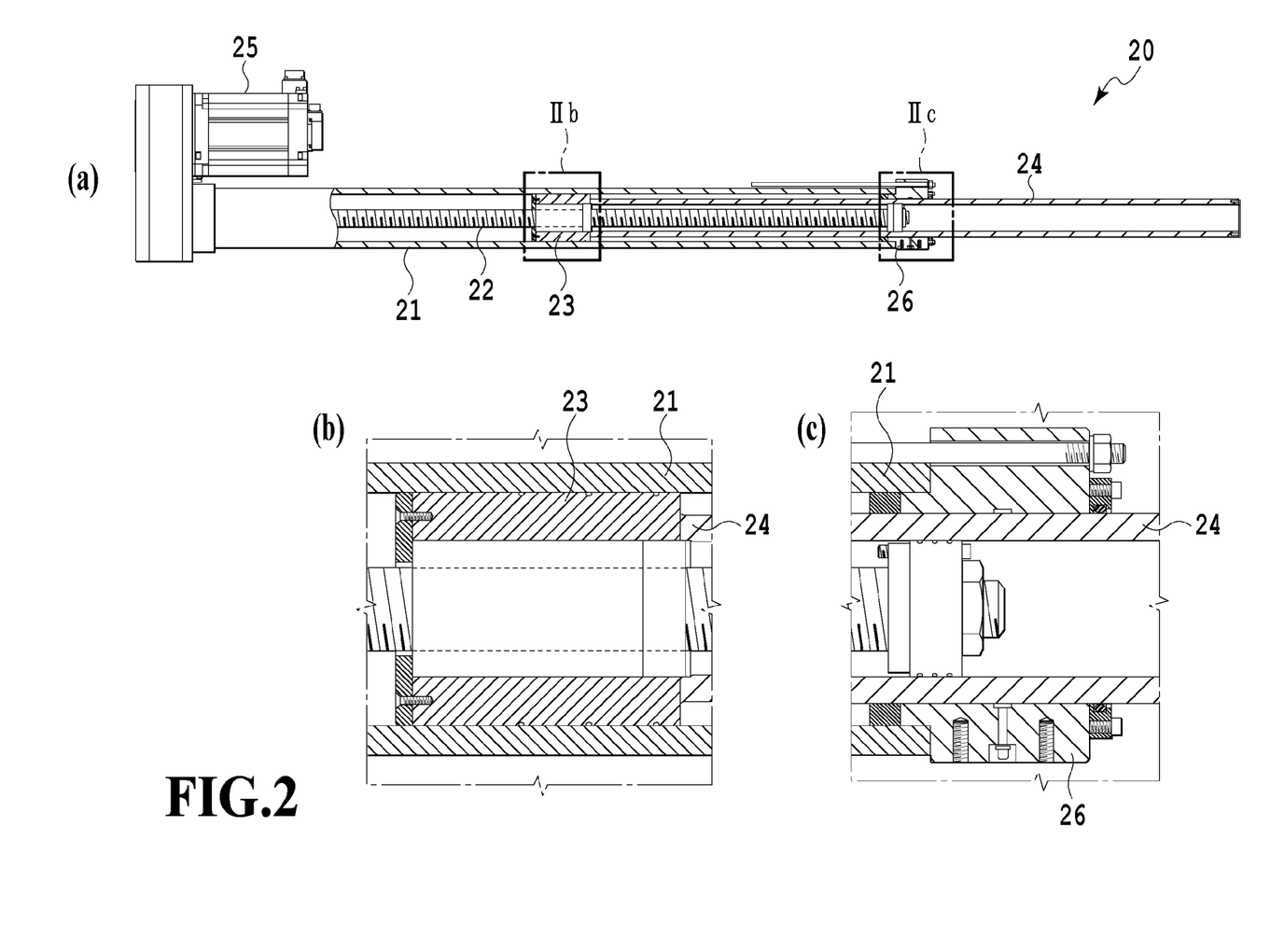
FIG. 2(a) is a longitudinal cross-section of a conventional actuator used in a tripod structure shown in FIG. 1.
FIG. 2(b) is an enlarged view of a IIb portion shown in FIG. 2(a).
FIG. 2(c) is an enlarged view of a IIc portion shown in FIG. 2(a).
Figure 3:
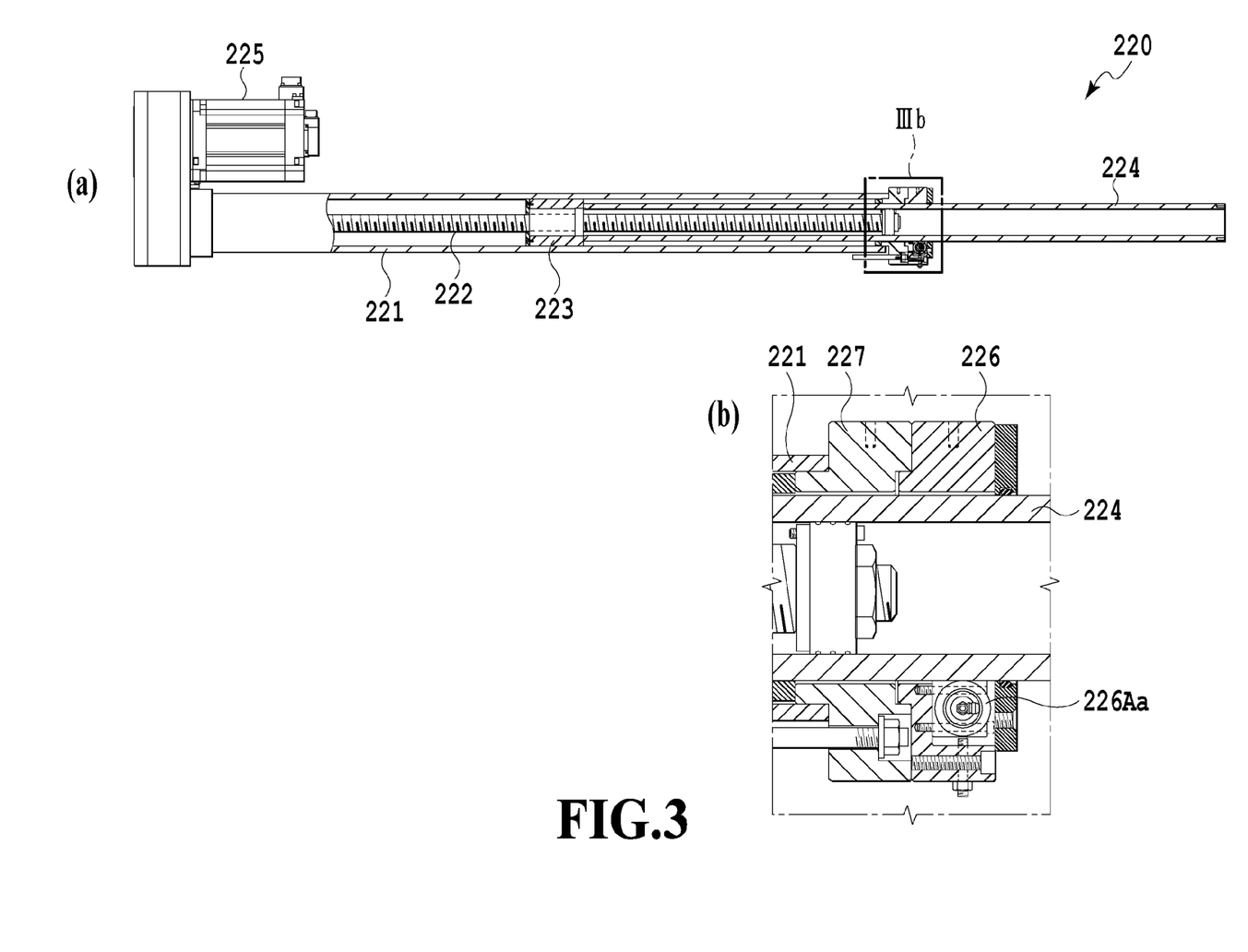
FIG. 3(a) is a longitudinal cross-section of an actuator of the present invention.
FIG. 3(b) is an enlarged view of a IIIb portion shown in FIG. 3(a).

In such a tripod structure, for example, an electric actuator as disclosed in Patent Literature 2 is used. As shown in FIG. 2 described later, such an actuator includes, in a pipe, at least a ball screw used as a feed screw, a conversion nut used as a feed nut, and a piston fixed integrally to the conversion nut to convert the rotary motion of the ball screw into the linear motion of the piston.

CITATION LIST

Patent Literature

PTL 1: Japanese Patent No. 5813706
PTL 2: Japanese Patent Laid-Open No. 2015-40614
PTL 3: Japanese Patent Laid-Open No. 2001-124175

SUMMARY OF INVENTION

Technical Problem

Figure 7:
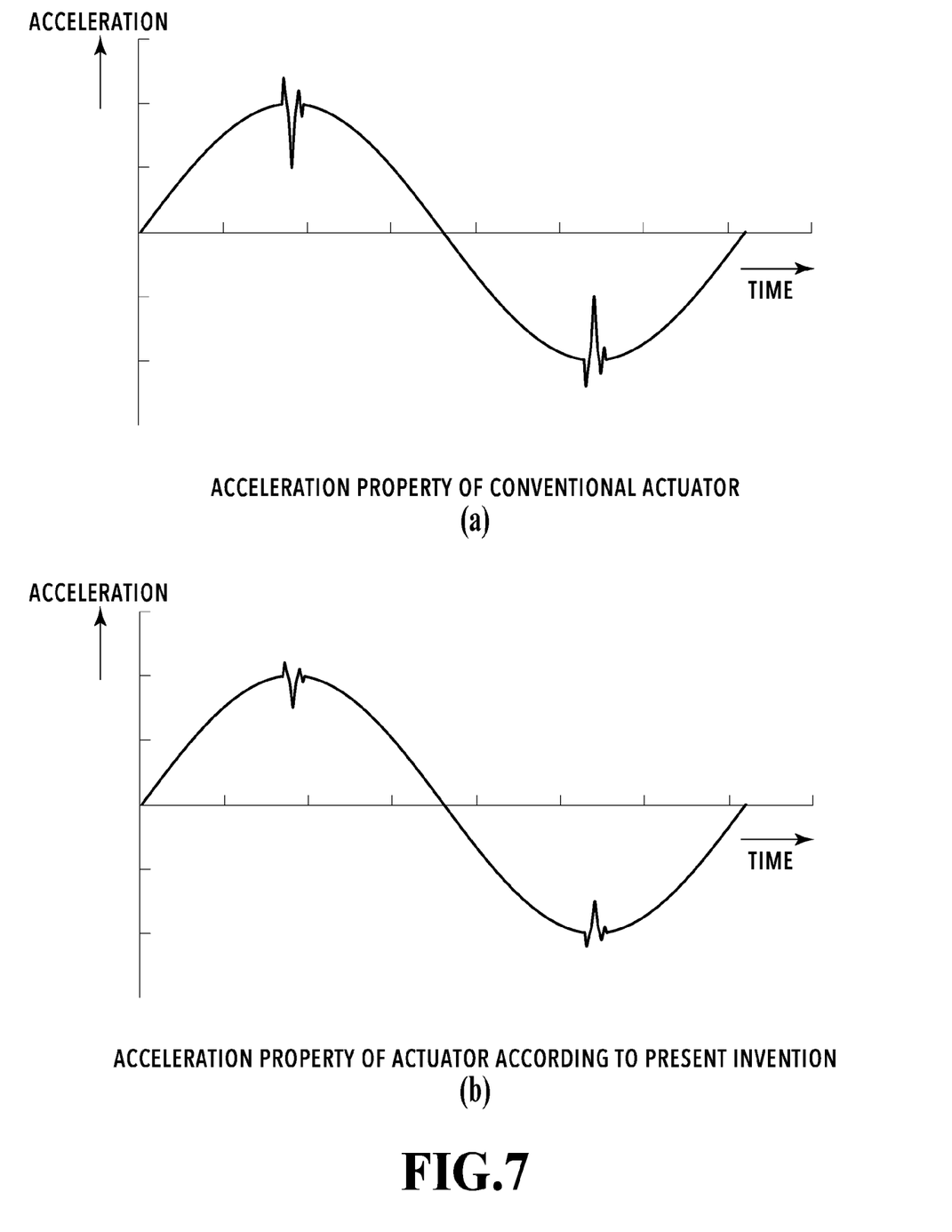
FIG. 7(a) is a diagram showing the acceleration property of the conventional actuator.
FIG. 7(b) is a diagram showing the acceleration property of the actuator of the present invention.

For such a conventional actuator, as shown in Patent Literature 3, a sliding bearing has been used as a support mechanism provided on a tip of the pipe to hold the piston movably. However, in an actuator used in the tripod structure, a load in a lateral direction orthogonal to an axis, that is, a moment caused by its own weight due to being installed horizontally with respect to gravity, or a lateral moment or the like generated by driving another actuator generates friction between a support unit (a sliding bearing unit 26 in this case) of a piston 24 shown in FIG. 2(c) and a support unit of a conversion nut 23 shown in FIG. 2(b). The frictional force, as shown in FIG. 7(a) described later, generates a shock in acceleration at the time of a turn, and in the case of a boarding type driving simulator, gives a driver uncomfortableness depending on a test scenario. As a result, an evaluation may be affected.

A structure which uses a ball spline instead of a sliding bearing to reduce friction is also known as a support mechanism for the piston. However, in the tripod structure to which a relatively large load is applied, in a case where a load in a lateral direction orthogonal to the axis is applied to the actuator, the load may be concentrated on the ball of the spline at a tip portion, and the portion may be damaged. To solve this problem, a method using a larger ball spline is also possible but has a problem that manufacture is difficult and costs.

Thus, an object of the present invention is to provide an actuator capable of reducing a shock in acceleration at the time of a turn caused by a load in a lateral direction orthogonal to an axis of the actuator even in a case where the load is excessive while reducing manufacturing cost and manufacturing man-hours, and a tripod structure including the actuator.

Solution to Problem

To solve the above problem, an actuator according to the present invention includes a pipe, a ball screw used as a feed screw and arranged within the pipe, a conversion nut used as a feed nut, arranged within the pipe, and screwed with the ball screw, the conversion nut converting a rotary motion into a linear motion, a piston arranged within the pipe, fixed integrally to the conversion nut, and driven to expand and contract from a free end which is one end of the pipe, and a support mechanism provided on a tip of the free end of the pipe, the support mechanism holding the piston movably. The support mechanism is a rolling bearing structure including a plurality of roller followers.

The rolling bearing structure may include the plurality of roller followers and a holding unit in which the plurality of roller followers are arranged around the piston so that each of the plurality of roller followers rotates and holds the piston movably.

In the rolling bearing structure, each of the plurality of roller followers may be preloaded with respect to the piston, so that the piston is preloaded and held.

The rolling bearing structure may be provided with the three or more roller followers.

To solve the above problem, a tripod structure according to the present invention includes the three actuators, the three actuators being connected to a moving base so as to be separated from each other at a central angle of 120° in an initial state as viewed from above, wherein the moving base can move in an X-Y direction on a sliding floor via an air bearing and can rotate around a Z axis (yaw motion).

Advantageous Effects of Invention

According to the present invention, changing the piston support unit from the sliding bearing to the rolling bearing enables reducing the frictional force of an entire actuator to half or less, and it is possible to provide the actuator capable of reducing by half a shock in acceleration at the time of a turn caused by a load in a lateral direction orthogonal to the axis of the actuator even in a case where the load is excessive while reducing manufacturing cost and manufacturing man-hours, and the tripod structure including the actuator. As a result, a use range of a driving simulator can be expanded.

DESCRIPTION OF EMBODIMENTS

An embodiment of the present invention will be described with reference to the drawings.

FIG. 1 is a diagram showing an example of a vibration system for a driving simulator.

In FIG. 1, a vibration system 10 for a driving simulator mainly includes a hexapod structure 100 and a tripod structure 200.

The hexapod structure 100, also called a Stewart platform, has a top plate 110 whose top is provided with a cockpit, the top plate 110 being connected to three portions each of which has two actuators 120, that is, to six actuators 120A, 120B, 120C, 120D, 120E, 120F to support the top plate 110. For example, a hydraulic jack or an electric actuator can be used as the actuators 120A, 120B, 120C, 120D, 120E, 120F used herein. In this embodiment, an electric actuator is used as shown in FIGS. 2(a) to 3(b) described later. The lengths of the six actuators 120A, 120B, 120C, 120D, 120E, 120F are controlled, but the actuators are connected using universal joints so that their angles can be freely changed.

The hexapod structure 100 is configured to be capable of reproducing not only translational motions in three directions of X, Y, and Z axes consisting of the X and Y axes set on a sliding floor 240 plane described later and the Z axis perpendicular to the plane, but also rotary motions around each axis, that is, tilt motions with 6 degrees of freedom consisting of motions in a forward-backward direction, a left-right direction, and an up-down direction, a roll motion, a pitch motion, and a yaw motion, so that a driving state can be simulated based on a driving operation by an operator.

In the tripod structure 200, three actuators 220A, 220B, 220C are connected to a moving base 210 with the hexapod structure 100 described above mounted on the top so as to be separated from each other at a central angle of 120° in an initial state as viewed from above. In the tripod structure 200, the lengths of the three actuators 220A, 220B, 220C are controlled, so that the moving base 210 can move in an X-Y direction on the sliding floor 240 via an air bearing 230 using air pressure or the like and can rotate around the Z axis (yaw motion). A small-amplitude motion at a relatively high frequency is reproduced by the hexapod structure 100, and a large-amplitude motion at a relatively low frequency is reproduced by the tripod structure 200.

FIG. 2(a) is a longitudinal cross-section of a conventional actuator 20 used in the tripod structure 200 shown in FIG. 1. FIG. 2(b) is an enlarged view of a IIb portion shown in FIG. 2(a). FIG. 2(c) is an enlarged view of a IIc portion shown in FIG. 2(a).

In FIGS. 2(a) to 2(c), the conventional actuator 20 includes a pipe 21, a ball screw 22, a conversion nut 23, a piston 24, a servomotor 25, and a sliding bearing unit 26.

The pipe 21 is formed in a cylindrical shape, and the ball screw 22, the conversion nut 23, and the piston 24 are arranged within the pipe 21. The ball screw 22 is connected to the servomotor 25 by means of a timing belt mechanism (not shown) and is rotated and driven. As shown in FIG. 2(b), the conversion nut 23 is screwed with the ball screw 22, rotation is restricted in the pipe 21, and the conversion nut 23 is slid on an axis in the pipe 21 as the ball screw 22 rotates. The conversion nut 23 is slidably held within the pipe 21 by a sliding bearing. The ball screw 22 constitutes a feed screw, and the conversion nut 23 constitutes a feed nut.

The piston 24 is fixed to the conversion nut 23 and is moved within the pipe 21 in accordance with the movement of the conversion nut 23. The piston 24 is driven to expand and contract from the inside of a free end which is one end of the pipe 21, and constitutes a movable portion of the actuator 20. That is, in the actuator 20, the rotary motion of the ball screw 22 rotated and driven by the servomotor 25 is converted into the linear motion of the piston 24. As shown in FIG. 2(c), the sliding bearing unit 26 is provided on the tip of the free end which is the one end of the pipe 21, and holds the moving piston 24 slidably to constitute a support mechanism for the piston 24.

The conventional actuator 20 configured in such a manner has a problem that as shown in FIG. 7(a) described later, a shock is generated in the acceleration property of the actuator at the time of a turn, and may give a driver uncomfortableness. In this case, an evaluator who evaluates the performance of a vehicle cannot determine whether the shock is due to a vehicle movement or a shock due to the simulator, which adversely affects a performance evaluation of the vehicle.

As a result of consideration, it turns out that the cause of the problem is that using the actuator used in the tripod structure of the driving simulator as shown in FIG. 1 makes a frictional force excessive due to a load in a lateral direction orthogonal to an axis, that is, a moment caused by its own weight due to being installed horizontally with respect to gravity, a moment in a lateral direction generated by driving another actuator, or the like. Therefore, a description will be given below of an actuator according to the present invention that reduces by half a shock at the time of a turn in an acceleration, which has been a problem which the conventional actuator described above has.

FIG. 3(a) is a longitudinal cross-section of an actuator 220 according to the present invention. FIG. 3(b) is an enlarged view of a IIIb portion shown in FIG. 3(a).

In FIGS. 3(a) and 3(b), the actuator 220 according to the present invention includes a pipe 221, a ball screw 222, a conversion nut 223, a piston 224, a servomotor 225, a rolling bearing unit 226, and a fixing flange 227.

The actuator 220 according to the present invention shown in FIGS. 3(a) and 3(b) is different from the conventional actuator 20 shown in FIGS. 2(a) to 2(c) mainly in that the rolling bearing unit 226 and the fixing flange 227 for fixing the rolling bearing unit 226 are provided as a support mechanism for the piston 224 instead of the sliding bearing unit 26, and is identical to the conventional actuator 20 in the other respects. The same reference numerals are applied to the same constituent elements, and the descriptions thereof will be omitted.

The fixing flange 227 is, as shown in FIG. 3(b), fixed to a tip of a free end of the pipe 221 with a stud bolt or the like, and the rolling bearing unit 226 is fixed to the fixing flange 227 with a bolt or the like, but the present invention is not limited to this configuration. That is, the rolling bearing unit 226 may be directly fixed to the tip of the free end of the pipe 221 without providing the fixing flange 227.

It has been conventionally known that a rolling bearing generally has a friction coefficient of about 1/10 to 1/100 of a sliding bearing's friction coefficient of 0.1 to 0.2, resulting in significantly reducing a frictional force. There is also a method using a ball spline instead of the conventional sliding bearing. However, since the ball of the ball spline is small, a load is concentrated on the ball in a tip portion, and the portion may be damaged. In contrast, since a roller follower is used in the rolling bearing unit 226 according to the present invention as described later, a roller follower of a relatively large size can be used, and the rolling bearing unit 226 also has resistance to a large load.

Figure 4:
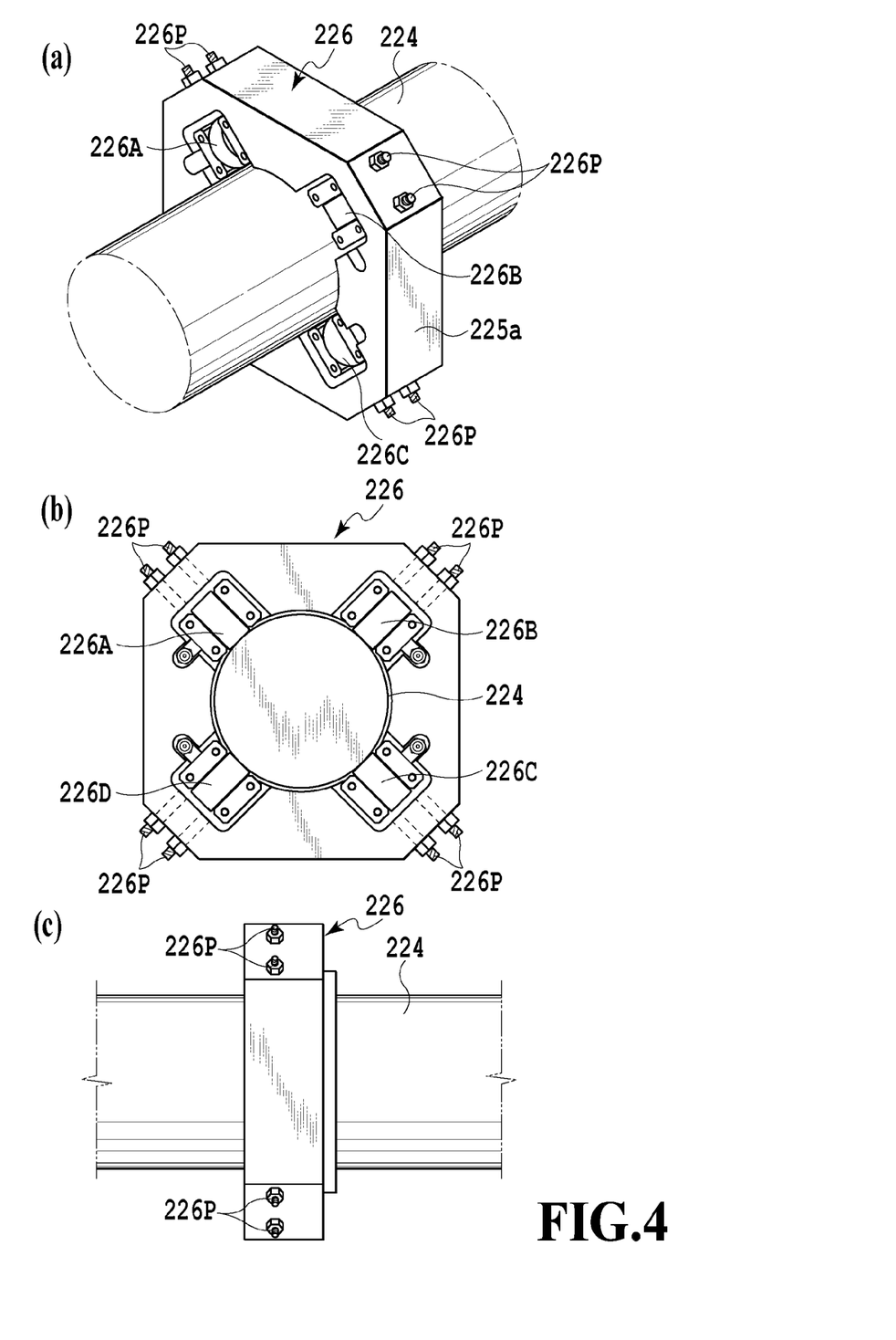
FIG. 4(a) is a perspective view showing a rolling bearing unit shown in FIG. 3(b).
FIG. 4(b) is a front view of the rolling bearing unit shown in FIG. 4(a).
FIG. 4(c) is a side view of the rolling bearing unit shown in FIG. 4(a).

FIG. 4(a) is a perspective view showing the rolling bearing unit 226 shown in FIG. 3(b). FIG. 4(b) is a front view of the rolling bearing unit 226 shown in FIG. 4(a). FIG. 4(c) is a side view of the rolling bearing unit 226 shown in FIG. 4(a).

As shown in FIGS. 4(a) to 4(c), the rolling bearing unit 226 mainly includes four roller follower units 226A, 226B, 226C, 226D and a holding unit 226a for holding the roller follower units. In this embodiment, the four roller follower units 226A, 226B, 226C, 226D are provided, but any number of roller follower units may be provided as long as the number is three or more in order to hold a shaft core of the piston 224. Since the shapes of the roller follower units 226A, 226B, 226C, 226D are the same, the roller follower unit 226A is taken as an example to give a description below.

Figure 5:
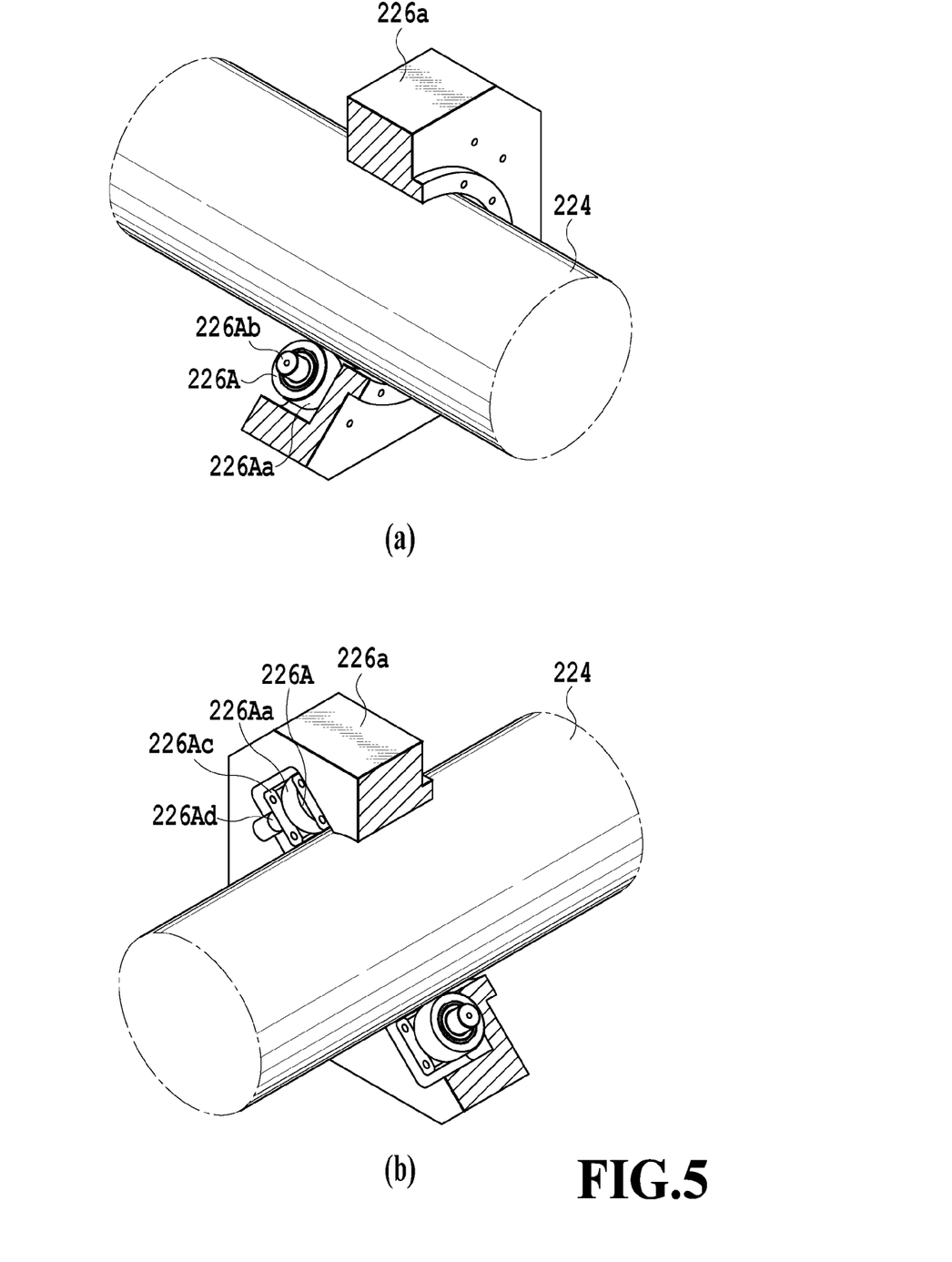
FIG. 5(a) is a partial cross-section for illustrating the rolling bearing unit shown in FIG. 4(a).
FIG. 5(b) is a partial cross-section showing the rolling bearing unit shown in FIG. 4(a) from a direction different from that in FIG. 5(a).
Figure 6:
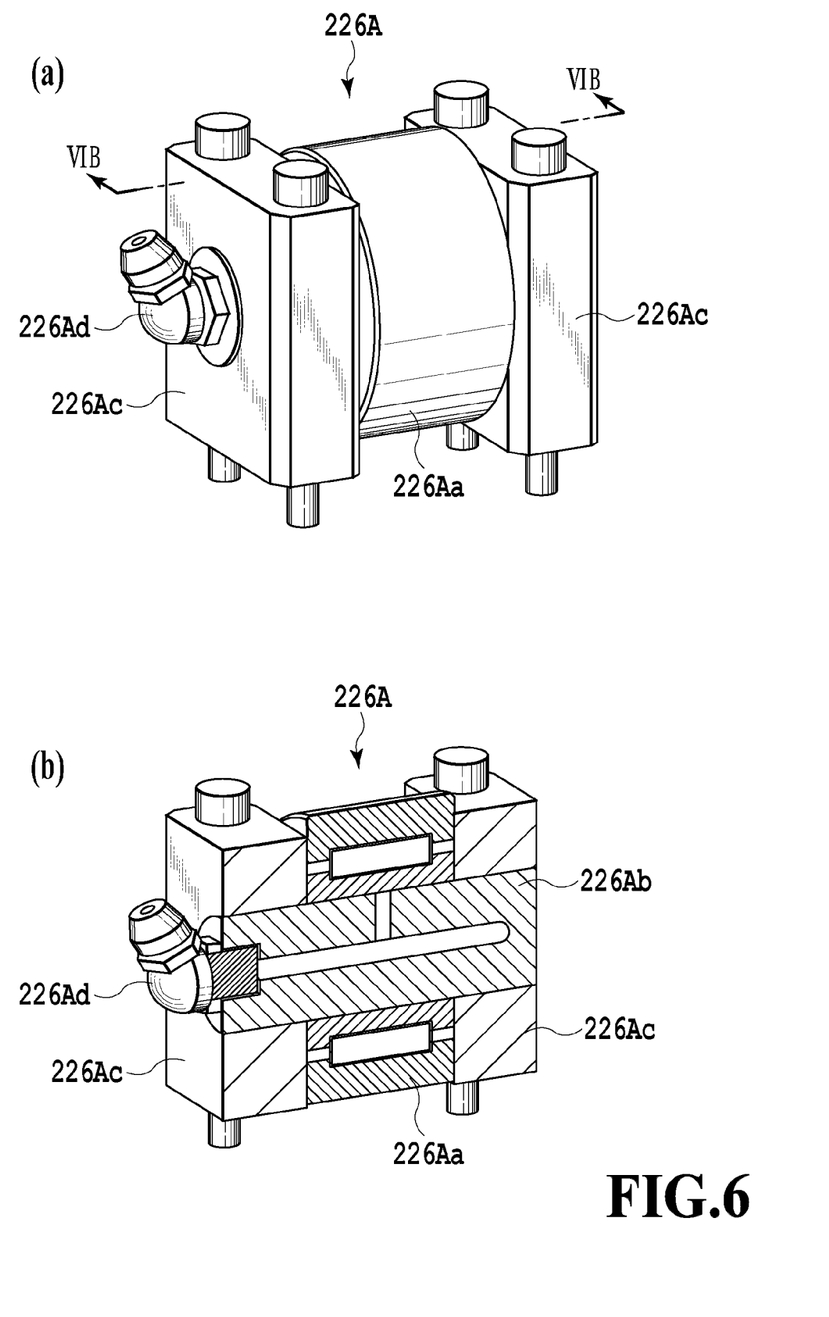
FIG. 6(a) is a perspective view showing a roller follower unit of the rolling bearing unit.
FIG. 6(b) is a cross-sectional view showing the roller follower unit.

FIG. 5(a) is a partial cross-section for illustrating the rolling bearing unit 226 shown in FIG. 4(a). FIG. 5(b) is a partial cross-section showing the rolling bearing unit 226 shown in FIG. 4(a) from a direction different from that in FIG. 5(a). FIG. 6(a) is a perspective view showing the roller follower unit 226A of the rolling bearing unit 226. FIG. 6(b) is a cross-sectional view showing the roller follower unit 226A.

As shown in FIGS. 5(a) to 6(b), a roller follower is a donut-shaped bearing in which a needle-shaped roller called a needle is incorporated, and the roller follower unit 226A is mainly formed of a roller follower 226Aa, a shaft 226Ab which is arranged at the center of the roller follower 226Aa and serves as a rotation shaft, two yokes 226Ac which are arranged on both sides of the shaft 226Ab and hold the shaft 226Ab rotatably, and a grease nipple 226Ad arranged at one end of the shaft 226Ab for injecting lubricating grease into the roller follower 226Aa and the shaft 226Ab.

In the present embodiment, as shown in FIGS. 4(a) to 4(c), a preload screw 226P is used to apply a preload from behind the roller follower units 226A, 226B, 226C, 226D to the piston 224. As the preload screw 226P, a full screw bolt is used herein to apply a preload to the yoke 226Ac of the roller follower unit 226A, but the present invention is not limited to this. A method using a spring or another method may be used to apply a preload.

Applying a preload to the roller follower units 226A, 226B, 226C, 226D with the preload screw 226P or the like as described above eliminates play between the piston 224 and the roller follower units 226A, 226B, 226C, 226D, and in the actuator 220 used in the tripod structure 200, which has a relatively large load, the piston 224 can be stably held even in a case where a load in a lateral direction is excessive.

FIG. 7(a) is a diagram showing the acceleration property of the conventional actuator 20. FIG. 7(b) is a diagram showing the acceleration property of the actuator 220 according to the present invention.

In FIGS. 7(a) and 7(b), a vertical axis represents an acceleration and a horizontal axis represents time. The acceleration properties of the actuators 20, 220 mean the acceleration properties of the tip portions of the pistons 24, 224, which are movable units of the actuators 20, 220. As shown in FIG. 7(a), in the acceleration property of the conventional actuator 20, noises are generated near turning points in the acceleration, and it can be seen that shocks are generated. On the other hand, as shown in FIG. 7(b), in the acceleration property of the tip portion of the actuator 220 according to the present invention, noises near the turning points in the acceleration are reduced by half, and it can be seen that the problem is improved.

As described above, using the actuator 220 of the present embodiment can significantly reduce the friction coefficient of the support mechanism for the piston 224 by providing the rolling bearing unit 226 instead of the sliding bearing unit 26. Even in a case where the load in the lateral direction orthogonal to the axis of the actuator 220 is relatively large, the rolling bearing unit 226 can have resistance to the load by being provided with three or more roller follower units 226A or the like of a relatively large size having resistance to a large load. Further, a preload is applied to the piston 224 with a preload screw 226P or the like from behind the roller follower units 226A or the like, so that the piston 224 can be stably held even in a case where the load in the lateral direction is excessive.

The embodiment in which the actuator 220 and the tripod structure 200 including the actuator 220 according to the present invention are mounted on the vibration system 10 for a driving simulator has been described above as an example, but the present invention is not limited to this. That is, the present invention may be used, for example, in transportation equipment such as automobiles, motorcycles, trains, aircraft, and ships, structures such as bridges, buildings, houses, and architecture, and test devices for conducting various tests such as a loading test conducted by applying an external force to structures under test such as parts of the above equipment and structures, a vibration test conducted by applying vibration thereto, and a simulation test, for example, of a driving state based on an operator's driving operation.

As described above, according to the present invention, it is possible to provide an actuator capable of reducing a shock in an acceleration at the time of a turn caused by a load in a lateral direction orthogonal to an axis of the actuator even in a case where the load is excessive while reducing manufacturing cost and manufacturing man-hours, and a tripod structure using the actuator.

The invention claimed is:

1. An actuator comprising:
   a pipe;
   a ball screw used as a feed screw and arranged within the pipe;
   a conversion nut used as a feed nut, arranged within the pipe, and screwed with the ball screw, the conversion nut converting a rotary motion into a linear motion;
   a piston arranged within the pipe, fixed integrally to the conversion nut, and driven to expand and contract from a free end which is one end of the pipe; and
   a support mechanism provided on a tip of the free end of the pipe, the support mechanism holding the piston movably,
   wherein the support mechanism is a rolling bearing structure comprising a plurality of roller followers, wherein each of the roller followers is positioned between yokes and wherein each of the roller followers is preloaded by applying a preload to the yokes.

2. The actuator according to claim 1, wherein the rolling bearing structure comprises the plurality of roller followers and a holding unit in which the plurality of roller followers are arranged around the piston so that each of the roller followers rotates to hold the piston movably.

3. The actuator according to claim 1, wherein in the rolling bearing structure, each of the plurality of roller followers is preloaded with respect to piston, and the piston is preloaded and held.

4. The actuator according to claim 1, wherein the rolling bearing structure is provided with three or more of the roller followers.

5. A tripod structure comprising three of the actuators according to any one of claims 1 to 4, wherein the three actuators are connected to a moving base so as to be separated from each other at a central angle of 120° in an initial state as viewed from above, and the moving base can move in an X-Y direction on a sliding floor via an air bearing and can rotate around a Z axis (yaw motion).

* * * * *